United States Patent
Kitabatake et al.

(10) Patent No.: US 12,272,828 B2
(45) Date of Patent: Apr. 8, 2025

(54) ELECTRODE CATALYST LAYER FOR FUEL CELL, AND SOLID POLYMER-TYPE FUEL CELL COMPRISING SAID ELECTRODE CATALYST LAYER

(71) Applicant: Mitsui Mining & Smelting Co., Ltd., Tokyo (JP)

(72) Inventors: Takuya Kitabatake, Ageo (JP); Joji Miki, Ageo (JP); Haruka Watanabe, Ageo (JP)

(73) Assignee: Mitsui Mining & Smelting Co., Ltd. (JP)

( * ) Notice: Subject to any disclaimer, the term of this patent is extended or adjusted under 35 U.S.C. 154(b) by 383 days.

(21) Appl. No.: 17/792,459

(22) PCT Filed: Feb. 12, 2021

(86) PCT No.: PCT/JP2021/005345
§ 371 (c)(1),
(2) Date: Jul. 13, 2022

(87) PCT Pub. No.: WO2021/172059
PCT Pub. Date: Sep. 2, 2021

(65) Prior Publication Data
US 2023/0049734 A1 Feb. 16, 2023

(30) Foreign Application Priority Data
Feb. 27, 2020 (JP) .................. 2020-032391

(51) Int. Cl.
*H01M 4/92* (2006.01)
*H01M 4/86* (2006.01)
*H01M 8/10* (2016.01)
*H01M 8/1018* (2016.01)

(52) U.S. Cl.
CPC ......... *H01M 4/925* (2013.01); *H01M 8/1018* (2013.01); *H01M 2004/8684* (2013.01); *H01M 2008/1095* (2013.01)

(58) Field of Classification Search
CPC .. H01M 4/925; H01M 8/1018; H01M 4/8647; H01M 4/8663; H01M 4/86; H01M 4/9016; H01M 4/92; H01M 4/921; H01M 4/926; H01M 8/10; H01M 4/90
See application file for complete search history.

(56) References Cited

U.S. PATENT DOCUMENTS

| 2014/0349203 A1 | 11/2014 | Klose-Schubert et al. |
| 2018/0175397 A1* | 6/2018 | Shintani .............. H01M 4/8657 |

FOREIGN PATENT DOCUMENTS

| JP | 2015-502646 A | 1/2015 |
| JP | 2016-81584 A | 5/2016 |
| WO | 2005-068071 A1 | 7/2005 |

OTHER PUBLICATIONS

International Search Report (English and Japanese) issued in PCT/JP2021/005345, mailed Apr. 6, 2021; ISA/JP (5 pages).

Laure Cheballier, et al. "Mesoporous Nanostructured Nb-Doped Titanuim Dioxide Microsphere Catalyst Supports for PEM Fuel Cell Electrodes"; ACS Applied Materials & Interfaces; vol. 44; Mar. 19, 2012; pp. 1752-1759 (total 8 pages).

Akimitsu Ishihara, et al. "Niobium-added titanium oxides powders as non-noble metal cathodes for polymer electrolyte fuel cells—Electrochemical evaluation and effect of added amount of niobium"; International Journal of Hydrogen Energy; vol. 45; Sep. 19, 2019; pp. 5438-5448 (total 11 pages).

* cited by examiner

*Primary Examiner* — Stewart A Fraser
(74) *Attorney, Agent, or Firm* — Harness, Dickey & Pierce, P.L.C.

(57) ABSTRACT

An electrode catalyst layer for a fuel cell includes a catalyst/support composite including a support and a catalyst supported thereon. The support contains a titanium oxide. The surface of the catalyst/support composite has an oxide of at least one element selected from the group consisting of niobium, tantalum, zirconium, and silicon. The ratio A2/A1 is from 0.35 to 1.70, wherein A1 is the atomic ratio of titanium on a surface of the catalyst layer and A2 is the atomic ratio of a total of niobium, tantalum, zirconium, and silicon on the surface of the catalyst layer, A1 and A2 being measured by X-ray photoelectron spectroscopy. The titanium oxide preferably has a composition $TiO_x$ ($0.5 \leq x < 2$).

5 Claims, No Drawings

ELECTRODE CATALYST LAYER FOR FUEL CELL, AND SOLID POLYMER-TYPE FUEL CELL COMPRISING SAID ELECTRODE CATALYST LAYER

CROSS REFERENCE TO RELATED APPLICATIONS

This application is a U.S. National Phase Application under 35 U.S.C. 371 of International Application No. PCT/JP2021/005345, filed on Feb. 12, 2021, which claims priority to Japanese Patent Application No. 2020-032391, filed on Feb. 27, 2020. The entire disclosures of the above applications are expressly incorporated by reference herein.

BACKGROUND

Technical Field

The present invention relates to an electrode catalyst layer for a fuel cell. The present invention also relates to a solid polymer fuel cell including the electrode catalyst layer.

Related Art

Titanium oxides are known as one of the supports used in electrode catalyst layers of fuel cells. Titanium oxides are highly stable even when exposed to high electric potentials, and accordingly, they are considered to be a promising alternative to conventional carbon-based supports. For example, JP 2016-081584A discloses the use of an electro-conductive particle as a support for a catalyst. The electro-conductive particle includes a Magneli phase titanium oxide represented by $Ti_nO_{2n-1}$ (n satisfies $4 \leq n \leq 10$) as a base material and an electro-conductive layer on the surface of the base material, the electro-conductive layer being formed by doping the surface of the base material with a group 5 transition metal element such as niobium or tantalum.

An electrode catalyst layer of a fuel cell contains a strongly acidic substance such as an ionomer, in addition to a catalyst on support (hereinafter also referred to as a catalyst/support composite). Furthermore, typically, a solid electrolyte layer in contact with the electrode catalyst layer is also made of a strongly acidic substance. Accordingly, since the support made of a titanium oxide contacts with such a strongly acidic substance, titanium is likely to elute from the support during the operation of such a fuel cell. The elution of titanium is more likely to occur in particular at an anode, which is in a reductive atmosphere. The titanium that has eluted is diffused and re-precipitated, which can cause a decrease in catalytic activity and an increase in cell resistance. The titanium that has eluted can also cause a deterioration of the long-term durability of the fuel cell.

Accordingly, it is an object of the present invention to prevent elution of titanium during the operation while maintaining the catalytic activity, in a fuel cell including a titanium oxide as a support for a catalyst.

SUMMARY

The present invention achieves the above-described object by providing an electrode catalyst layer for a fuel cell, including a catalyst/support composite including a support and a catalyst supported on the support, wherein the support contains a titanium oxide,
a surface of the catalyst/support composite has an oxide of at least one element selected from the group consisting of niobium, tantalum, zirconium, and silicon, and
a ratio A2/A1 is from 0.35 to 1.70, wherein A1 is an atomic ratio of titanium on a surface of the catalyst layer and A2 is an atomic ratio of a total of niobium, tantalum, zirconium, and silicon on the surface of the catalyst layer, A1 and A2 being measured by X-ray photoelectron spectroscopy.

DETAILED DESCRIPTION

Hereinafter, the present invention will be described by way of preferred embodiments thereof. The present invention relates to an electrode catalyst layer for a fuel cell, the electrode catalyst layer containing a catalyst/support composite including a support and a catalyst supported thereon (in short, the catalyst/support composite is a catalyst on support). The support contains a titanium oxide. The titanium oxide contains titanium element (Ti) and oxygen element (O), and preferably, the remainder is inevitable impurities. The support containing the titanium oxide is preferably electro-conductive. The electrode catalyst layer containing the catalyst/support composite is used in an electrode of various types of fuel cells. For example, it is used as an anode catalyst layer and/or a cathode catalyst layer of a solid polymer fuel cell or a phosphoric acid fuel cell.

In the electrode catalyst layer of the present invention, an oxide of a specific element is contained in the surface of the catalyst/support composite contained in the catalyst layer. In the present invention, elution of titanium of the support is effectively prevented due to the presence of the oxide. In view of this, it is advantageous to use, as the oxide, those that have an oxidation-reduction potential of 0 V or approximately 0 V in a reductive atmosphere and are unlikely to cause elution of the element in a low pH region (e.g., pH=0 to 1). The oxide may be, for example, an oxide of at least one element selected from the group consisting of niobium, tantalum, zirconium, and silicon. Hereinafter, oxides of these elements are referred to as a "coating oxide" for convenience.

The coating oxide is present on the surface of the catalyst/support composite. Specifically, on the surface of the support, the coating oxide may be present in a site where the catalyst is not supported. The coating oxide may be present on the surface of the catalyst. The coating oxide may be present on the entire surface of the catalyst/support composite. The inventors of the present invention have found that the coating oxide present in any of such states can effectively prevent elution of titanium of the support.

In contrast to this, in the technique disclosed in JP 2016-081584A, a titanium oxide doped with niobium and/or tantalum is present on the surface of a support made of a titanium oxide, and a catalyst is supported thereon. In such a configuration, elution of titanium from the support cannot be prevented.

In view of further effectively prevent elution of titanium from the support by the coating oxide on the surface of the catalyst/support composite, it is preferable to control the amount of the coating oxide on the surface of the catalyst/support composite.

The amount of the coating oxide present on the surface of the catalyst/support composite can be easily measured by, for example, X-ray photoelectron spectroscopy (hereinafter also referred to as "XPS"). In the present invention, the atomic ratio of titanium on the surface of the electrode catalyst layer, A1, and the atomic ratio of the element (excluding oxygen) of the coating oxide, A2, are measured by XPS, and the ratio of A2 to A1, A2/A1, is controlled. The element of the coating oxide is the at least one element selected from the group consisting of niobium, tantalum, zirconium, and silicon. In the case in which two or more of these elements are contained in the coating oxide, A2 means a ratio of the total of all elements.

In view of effectively preventing elution of titanium from the support, the ratio A2/A1 is preferably 0.35 or more, and more preferably 0.45 or more. On the other hand, in view of preventing an increase in cell resistance due to an increase in the amount of coating oxide, the ratio A2/A1 is preferably 1.70 or less, more preferably 1.50 or less, and even more preferably 0.80 or less.

The ratio A2/A1 can be controlled by appropriately setting conditions when arranging the coating oxide on the catalyst/support composite. The measurement method by XPS for obtaining the values of A1 and A2 will be described in detail in Examples later.

The ratio A2/A1 preferably satisfies the above-mentioned value in the state of the electrode catalyst layer alone. Alternatively, the ratio A2/A1 preferably satisfies the above-mentioned value when the electrode catalyst layer is included in a catalyst coated membrane (hereinafter also referred to as a "CCM") or a membrane electrode assembly (hereinafter also referred to as an "MEA"). Furthermore, the ratio A2/A1 preferably satisfies the above-mentioned value before and/or after the operation of a fuel cell that includes the electrode catalyst layer.

The coating oxide can be present in a particle form on the surface of the catalyst/support composite. Alternatively, the coating oxide can be present in a membrane form on the surface of the catalyst/support composite. Whether the coating oxide is to be present in a particle form or a membrane form can be determined according to the type of element of the coating oxide. For example, in the case in which the element of the coating oxide is one or more of niobium, tantalum, and zirconium, it is advantageous that the coating oxide be present in a particle form on the surface of the catalyst/support composite. The reason for this is that these elements are stable at a potential of 0 V and a pH of 0 to 1 in the potential/pH diagram. On the other hand, in the case in which the element of the coating oxide is, for example, silicon, it is advantageous that the coating oxide be present in a membrane form on the surface of the catalyst/support composite.

In the case in which the coating oxide is present in a particle form on the surface of the catalyst/support composite, the particle diameter of the coating oxide, D1, is preferably smaller than the particle diameter of the catalyst/support composite, D2, in view of further effectively preventing elution of titanium from the support. In view of making this advantage greater, D1 is preferably from 10 to 35%, more preferably from 10 to 30%, and even more preferably from 15 to 25% of D2. D1 and D2 are apparent diameters (Feret diameters) measured through observation with a scanning electron microscope. The particle diameters are measured on 100 or more samples, and the arithmetic mean values thereof are taken as D1 and D2.

The support used in the present invention preferably contains a titanium oxide as described above. Among titanium oxides, preferred are those that are electro-conductive, in view of increasing the activity of the electrode catalyst layer. From this viewpoint, the titanium oxide is preferably a titanium oxide that is represented by a compositional formula $TiO_X$ (where x is preferably 0.5≤x<2, and more preferably 0.5≤x<1.9). While known typical examples of titanium oxides include titanium dioxide ($TiO_2$), which is oxide of tetravalent titanium, the titanium oxide represented by the above-mentioned compositional formula can be said to be more oxygen-deficient than the titanium dioxide. The inventors of the present invention consider that the titanium oxide represented by the above-mentioned compositional formula is electro-conductive due to this oxygen-deficient state.

The titanium oxide preferably has a crystal phase of $Ti_4O_7$, $Ti_2O_3$, $TiO_{0.5}$, $TiO$, or $Ti_3O_5$. Among them, crystalline $TiO_{0.5}$, $TiO$, and $Ti_4O_7$ are particularly highly electro-conductive materials. Accordingly, in the case in which the support contains crystalline $TiO_{0.5}$, $TiO$, or $Ti_4O_7$, the support has an increased conductivity, and thus the catalyst supported on the support can fully deliver its performance.

The presence of a crystal phase of $Ti_4O_7$, $Ti_2O_3$, $TiO_{0.5}$, $TiO$, or $Ti_3O_5$ in a titanium oxide can be confirmed by X-ray diffraction (XRD) analysis of the titanium oxide. In XRD, it may be confirmed that the titanium oxide has only a crystal phase of $Ti_4O_7$, $Ti_2O_3$, $TiO_{0.5}$, $TiO$, or $Ti_3O_5$, or it may be confirmed that the titanium oxide has two or more crystal phases.

In the case in which the titanium oxide has two or more crystal phases, the crystal phases may be constituted by one main phase and at least one sub phase. The main phase is a crystal phase that preferably accounts for 30 mass % or more, and more preferably 50 mass % or more. The sub phase is a crystal phase that is present in a lower proportion than the main phase and is different from the main phase.

The main phase is preferably $TiO_{0.5}$ or $Ti_4O_7$, in view of high conductivity. On the other hand, the sub phase is preferably $TiO$ or $Ti_3O_5$.

Moreover, the titanium oxide may contain crystal phases or non-crystal phases of titanium oxides other than the crystal phase of $Ti_4O_7$, $Ti_2O_3$, $TiO_{0.5}$, $TiO$, or $Ti_3O_5$. Examples of such oxides include $TiO_2$. In the case in which $TiO_2$ is contained as a crystal phase, it may be any of rutile $TiO_2$, anatase $TiO_2$, and brookite $TiO_2$. The presence of a crystal phase of $TiO_2$ can be also confirmed by XRD.

In the titanium oxide, titanium may be partially replaced with other elements (e.g., metallic elements such as Nb, Ta, Mo, W, Ge, Sb, Bi, Hf, Zr, Mg, Ca, Sr, Ba, Zn, Al, etc.).

The above-described titanium oxide is suitably produced by the methods described, for example, in WO2013/141063 or WO2019/3788.

The catalyst/support composite including the above-described titanium oxide as a support preferably has a large BET specific surface area, in view of increasing the catalytic activity. Specifically, the catalyst/support composite has a BET specific surface area of preferably 1 to 30 $m^2/g$, more preferably 5 to 25 $m^2/g$, and even more preferably 10 to 25 $m^2/g$. In order to achieve the BET specific surface area in this range, a catalyst/support composite may be produced according to the method described later, for example. The BET specific surface area can be measured, for example, by the nitrogen adsorption method according to the single point BET method using a "BELSORP-MR6" available from MicrotracBEL Corp. The amount of powder to be measured is 0.3 g, and the condition for preliminary degassing is 80° C. for 10 minutes under atmospheric pressure.

The particle diameter of the catalyst/support composite in the present invention is preferably from 0.1 to 100 µm, more preferably from 0.1 to 50 µm, and even more preferably from 0.1 to 20 µm, in terms of the 50th percentile of the particle diameter on a volume basis, D50, obtained by a laser diffraction/scattering particle size distribution analysis method (e.g., using a laser diffraction/scattering particle size distribution analyzer LA-920 available from Horiba Ltd.). The catalytic activity can be increased to a sufficiently high level by setting the particle diameter of the catalyst/support composite of the present invention within this range.

In general, the amount of the catalyst supported in the catalyst/support composite is preferably from 1 to 50 mass %, more preferably from 5 to 45 mass %, and even more preferably from 15 to 40 mass %, based on the catalyst/support composite, though depending on the type of catalyst. The amount of the catalyst supported within this range is a minimal amount necessary for developing sufficient catalytic activity. The amount of the catalyst supported can be determined by dissolving the catalyst/support composite in, for example, an acid to prepare a solution, and subjecting the solution to ICP emission spectroscopic analysis.

The amount of catalyst is preferably set as appropriate to the amount of niobium, tantalum, zirconium, and silicon present on and near the surface of the electrode catalyst layer, in view of developing sufficient catalytic activity. From this viewpoint, the ratio of the atomic ratio of the total of niobium, tantalum, zirconium, and silicon on the surface of the electrode catalyst layer, A2, to the atomic ratio of the catalyst on the surface of the electrode catalyst layer, A3, (that is, A2/A3) is preferably 0.25 to 1.0, and more preferably 0.30 to 0.60, A2 and A3 being measured by XPS. The ratio A2/A3 can be controlled by appropriately setting the conditions when arranging the coating oxide on the catalyst/support composite and the conditions when allowing the support to support the catalyst.

The ratio A2/A3 preferably satisfies the above-mentioned value in the state of the electrode catalyst layer alone. Alternatively, the ratio A2/A3 preferably satisfies the above-mentioned value when the electrode catalyst layer is included in a CCM or an MEA. Furthermore, the ratio A2/A3 preferably satisfies the above-mentioned value before and/or after the operation of a fuel cell that includes the electrode catalyst layer.

The catalyst used in the present invention preferably contains platinum. The reason for this is that platinum has high hydrogen oxidation activity. From this viewpoint, the catalyst preferably contains platinum, or an alloy of platinum and one or more of iridium and ruthenium. The catalyst may be partially oxidized in the use environment.

The electrode catalyst layer may contain other components in addition to the catalyst/support composite. The electrode catalyst layer can contain, for example, an ionomer. The ionomer is preferably proton-conductive. When the electrode catalyst layer of the present invention contains an ionomer, the performance of the catalyst layer is further improved. The ionomer used may be, for example, a polymer material having a structure in which a perfluoroether pendant side chain with a sulfonic acid group at a terminal thereof is bonded to a polytetrafluoroethylene backbone. Examples of the ionomer include Nafion (registered trademark), Flemion (registered trademark), Aciplex (registered trademark), and Fumion F (registered trademark).

In the case in which the electrode catalyst layer contains an ionomer, it is advantageous to adjust the amount of the ionomer and the amount of the catalyst/support composite, in view of improving the performance of the electrode catalyst layer. For example, the electrode catalyst layer preferably has a ratio of the mass of the ionomer, I, to the mass of the catalyst/support composite, M, (i.e., a ratio I/M) of 0.06 or more, and more preferably 0.07 or more, in view of sufficiently covering the catalyst and also the catalyst/support composite and easily adapting to changes in the relative humidity of the external environment. On the other hand, in view of preventing an increase in the electric resistance caused by an increase in the abundance of the ionomer, as well as in view of preventing elution of titanium, the ratio I/M is preferably 0.25 or less, more preferably 0.22 or less, and even more preferably 0.20 or less. The ionomer is often supplied in the form of a dispersion liquid, and the term "mass of the ionomer, I" refers to the mass of solids in the dispersion liquid.

Next, a method for producing the electrode catalyst layer will be described. First, a method for producing a support used for the electrode catalyst layer will be described. To produce the support, metallic titanium and $TiO_2$ are used as starting materials. It is preferable to use, as metallic titanium, a metallic titanium powder with a particle diameter $D_{50}$ of 0.5 to 300 µm, in view of enhancing the reactivity between metallic titanium and $TiO_2$. From the same viewpoint, it is preferable to use, as $TiO_2$, a $TiO_2$ powder with a particle diameter $D_{50}$ of 0.01 to 5.0 µm. As $TiO_2$, any of rutile $TiO_2$, anatase $TiO_2$, and brookite $TiO_2$ can be used. In view of obtaining a support having a large specific surface area, it is preferable to use anatase $TiO_2$.

In the production of the support, the mixing ratio between metallic titanium and $TiO_2$ is adjusted as appropriate according to the number x in the compositional formula $TiO_X$. Generally, the amount of $TiO_2$ mixed is preferably 20 to 300 parts by mass, more preferably 40 to 230 parts by mass, and even more preferably 50 to 180 parts by mass, per 100 parts by mass of metallic titanium. For mixing, an ordinary dry mixing apparatus can be used, such as a mortar, an automatic mortar, a ball mill, a stamp mill, a V-type mixer, or a tumbler mixer.

After metallic titanium and $TiO_2$ have been mixed, the mixture is heated to produce a titanium oxide. In general, heating can be performed in a vacuum. In this case, the degree of vacuum, in absolute pressure, is preferably $1 \times 10^{-1}$ Pa or less, in view of successfully obtaining an intended titanium oxide. From the same viewpoint, the heating temperature is preferably from 600 to 1300° C., and more preferably from 750 to 1100° C. The heating time is preferably from 5 to 30 hours, and more preferably from 5 to 15 hours, when the heating temperature is within the above-described range.

Through the process described above, a support containing a titanium oxide can be obtained. Next, a catalyst is supported on the support to obtain a catalyst/support composite. Prior to supporting the catalyst, it is preferable to adjust the particle diameter of the support. To adjust the particle diameter, a pulverization apparatus such as a paint shaker or a bead mill can be used, for example. In this case, the support is preferably pulverized in an organic solvent, in view of preventing the support from coming into contact with oxygen and being oxidized. Examples of the organic solvent used for this purpose include: aliphatic monohydric alcohols such as ethanol, 2-propanol, and butanol; aromatic hydrocarbons such as toluene and benzene; aliphatic hydrocarbons such as hexane; ketones; esters; and ethers. In view of successfully pulverizing the support, the amount of the organic solvent used is preferably from 100 to 9900 parts by mass, and more preferably from 100 to 900 parts by mass, per 100 parts by mass of the support.

After the support has been pulverized in the organic solvent, the step of supporting a catalyst is performed. At that time, it is preferable to keep the catalyst from coming into contact with oxygen as much as possible during the period from the completion of the pulverization to supporting the catalyst, in view of preventing oxidization of the support. For this purpose, it is advantageous that the catalyst be supported on the pulverized support dispersed in the organic solvent, without subjecting the pulverized support to a drying/powdering step. That is, advantageously, the support is pulverized in the organic solvent, and then the resulting support is used, without drying/powdering, to support the catalyst on the support in the organic solvent. The organic solvent used to pulverize the support and the organic solvent used to support the catalyst on the support may be the same or different.

To support the catalyst, a material containing an element (e.g., platinum) for making the catalyst can be used. The material is mixed with the support dispersed in the organic solvent to allow the element for making the catalyst to attach to the surface of the support. At that time, the dispersion liquid may be heated, where necessary. Examples of the material containing the element for making a catalyst that contains platinum include hexachloro platinate salt, dinitrodianmineplatinum salt, hexaanminplatinum chloride, tetraammineplatinum hydroxide, and acetylacetonato platinum salt. Examples of the material containing the element for making a catalyst that contains iridium include iridium oxide, iridium chloride, and acetylacetonato iridium salt. Examples of the material containing the element for making a catalyst that contains ruthenium include ruthenium chloride, ruthenium oxide, ruthenium nitrate, hexaanminruthenium chloride, and acetylacetonato ruthenium salt.

After the element for making a catalyst has been supported on the support through the process described above, the resultant is subjected to a heating step to produce the catalyst on the surface of the support. In general, heating can be performed in a reductive atmosphere. It is preferable to use, as the reductive atmosphere, a mixed gas of hydrogen gas and an inert gas such as argon gas or nitrogen gas. In this case, the degree of reduction can be controlled by adjusting the ratio between the hydrogen gas and the inert gas in the mixed gas. In view of appropriately controlling the degree of reduction, the heating temperature is preferably from 400 to 1200° C., and more preferably from 550 to 900° C. The heating time is preferably from 0.1 to 20 hours, and more preferably from 1 to 10 hours, when the heating temperature is within the above-described range.

In the manner described above, a catalyst/support composite in which a catalyst is supported on the surface of the support containing a titanium oxide can be obtained. Next, a coating oxide is arranged on the surface of the catalyst/support composite. The coating oxide is arranged using, for example, a liquid phase deposition (LPD) method, an evaporation-to-dryness method, an atomic layer deposition (ALD) method, or the like. Hereinafter, these methods will be described.

LPD Method

The LPD method is a method in which an oxide thin film is directly synthesized from an aqueous solution on a base material by using the hydrolysis equilibrium reaction of a metal-fluoro complex in the aqueous solution. The outline of the reaction in the LPD method can be expressed by the following chemical reaction formula.

(Precipitation Equilibrium Reaction)

$$MF_x^{(x-2n)-} + nH_2O = MO_n + xF^- + 2nH^+ \quad (1)$$

where M represents an element of oxide.
(Precipitation-Causing Reaction)

$$H_3BO_3 + 4H^+ + 4F^- = HBF_4 + 3H_2O \quad (2)$$

$$Al^{3+} + 6H^+ + 6F^- = H_3AlF_6 + 3H^+ \quad (3)$$

In the LPD method, the main reaction is the hydrolysis equilibrium reaction (ligand exchange reaction) of the metal-fluoro complex $MF_x^{(x-2n)-}$ in the aqueous solution represented by Formula (1) above. To this reaction system, an agent for forming a fluorine compound that is more stable than the metal-fluoro complex (the agent is hereinafter also referred to as a fluoride ion scavenger) and the above-described catalyst/support composite are added. For example, when boric acid or aluminum ions serving as a fluoride ion scavenger are added to the reaction system described above, a more stable complex is formed through the reaction of Formula (2) or (3). The formation of this complex consumes the free fluoride ions and shifts the equilibrium of Formula (1) toward metal oxide precipitation. This causes the reaction of Formula (1) to proceed spontaneously, and the oxides that have become supersaturated in the aqueous solution are gradually deposited on the surface of the catalyst/support composite added to the aqueous solution.

In the case in which the coating oxide contains niobium oxide, niobium pentoxide ($Nb_2O_5$) may be used as a niobium source, and to an aqueous solution of a metal-fluoride complex obtained therefrom, boric acid ($H_3BO_3$) serving as a fluoride ion scavenge may be added, followed by further adding the catalyst/support composite to the mixture.

In the case in which the coating oxide contains tantalum oxide, tantalum pentoxide ($Ta_2O_5$) may be used as a tantalum source, and to an aqueous solution of a metal-fluoride complex obtained therefrom, boric acid ($H_3BO_3$) serving as a fluoride ion scavenger may be added, followed by further adding the catalyst/support composite to the mixture.

In the case in which the coating oxide contains zirconium oxide, zirconic acid fluoride ($H_2ZrF_6$) may be used as a zirconium source, and to an aqueous solution thereof, aluminum ion ($Al^{3+}$) serving as a fluoride ion scavenger may be added, followed by further adding the catalyst/support composite to the mixture.

After an oxide is produced on the surface of the catalyst/support composite, heat treatment is performed to stabilize the oxide. The heat treatment can generally be carried out in an oxygen-containing atmosphere such as an air atmosphere or in a reductive atmosphere. The reductive atmosphere may be an inert gas atmosphere (e.g., argon atmosphere) containing preferably 1 to 4 vol % hydrogen. When heat treatment is performed in a reductive atmosphere, the valence of the coating oxide can be kept low. The heating temperature is preferably from 400 to 900° C., and more preferably from 500 to 700° C., in view of stabilizing the oxide. From the same viewpoint, the heating time is preferably from 1 to 10 hours.

Evaporation-to-Dryness Method

In the evaporation-to-dryness method, a coupling agent containing an element for making the coating oxide is used. For example, in the case in which the element for making the coating oxide is silicon, a silane coupling agent can be used.

The catalyst/support composite is dispersed in an organic solvent, for example, a monovalent alcohol such as ethanol, and the coupling agent is added under this condition, followed by mixing the resulting dispersion liquid. Next, a catalyst for the coupling agent is added to the dispersion liquid to initiate the coupling reaction. The coupling reaction causes hydrolysis and subsequent dehydration-condensation of the coupling agent, resulting in the production of a condensed polymer of the coupling agent on the surface of the catalyst/support composite. The dispersion liquid may be heated to ensure smooth progress of the coupling reaction.

After the coupling reaction is completed, the dispersion liquid is subjected to evaporation to dryness to obtain solids. The solids are then subjected to heat treatment to oxidize the condensed polymer to produce a desired coating oxide. The heat treatment can generally be carried out in an oxygen-containing atmosphere such as an air atmosphere or in a reductive atmosphere. Specific examples of the reductive atmosphere are as described above. The heating temperature is preferably from 400 to 900° C., in view of reliably producing an oxide. From the same viewpoint, the heating time is preferably from 1 to 10 hours.

ALD Method

In the ALD method, a precursor gas containing the element for making the coating oxide is introduced into a chamber in which the catalyst/support composite is placed. The molecules of the precursor gas are then adsorbed on the surface of the catalyst/support composite. For example, in the case in which the element for making the coating oxide is zirconium, bis(methyl-η5-cyclopentadienyl)methoxymethylzirconium or tetrakis(ethylmethylamino)zirconium, for example, can be used as the precursor gas.

The remaining precursor gas in the chamber is then removed, and plasma-excited gas of humidified argon is then introduced into the chamber. The plasma-excited gas oxidizes the precursor gas to form one layer of oxide on the surface of the catalyst/support composite. This process is repeated until an oxide layer with a desired thickness is obtained.

After an oxide layer with a desired thickness is produced on the surface of the catalyst/support composite in this manner, heat treatment is performed to stabilize the oxide. The heat treatment can generally be carried out in an oxygen-containing atmosphere such as an air atmosphere or in a reductive atmosphere. Specific examples of the reductive atmosphere are as described above. The heating temperature is preferably from 150 to 700° C., in view of stabilizing the oxide. From the same viewpoint, the heating time is preferably from 1 to 10 hours.

After a catalyst/support composite having the coating oxide on the surface thereof is obtained using the above-described methods, a dispersion liquid containing the catalyst/support composite is prepared. For preparation of the dispersion liquid, the catalyst/support composite is mixed with a solvent. In this mixing step, an ionomer may be added, where necessary.

The solvent used for dispersing is preferably a primary alcohol. Examples of the primary alcohol include those having 1 to 10 carbon atoms. Among these, a saturated aliphatic alcohol is preferably used. Examples thereof include methanol, ethanol, propanol, butanol, pentanol, hexanol, heptanol, octanol, nonanol, and decanol. In particular, it is preferable to use a saturated aliphatic alcohol having 1 to 4 carbon atoms. The primary alcohols may be used singly or in a combination of two or more. Furthermore, other solvents that are not the above-described primary alcohols can also be used, including aliphatic monovalent alcohols such as 2-propanol, aromatic hydrocarbons such as toluene and benzene, aliphatic hydrocarbons such as hexane, other organic solvents such as ketones, esters, and ethers, and water.

A dispersion medium may be used for dispersing, and it is preferably a dispersion medium in the shape of a sphere. In this case, the sphere has a diameter of preferably 0.1 to 8 mm, more preferably 0.5 to 5 mm, and even more preferably 1 to 3 mm.

After the dispersion liquid of the catalyst/support composite having the coating oxide on the surface thereof is obtained in the manner described above, an electrode catalyst layer is formed from the dispersion liquid. The electrode catalyst layer is formed by, for example, applying the dispersion liquid to an object (substrate) using any type of application apparatus to form a coating film, and drying the coating film. As the object, a film of fluorine resin such as polytetrafluoroethylene can be used, for example. The electrode catalyst layer formed on the object is overlaid on, for example, a solid electrolyte membrane and then heat-pressed to transfer the electrode catalyst layer onto the surface of the solid electrolyte membrane. As a result of the transfer, a CCM including the solid electrolyte membrane and the electrode catalyst layer on the surface thereof is obtained.

The electrode catalyst layer formed in the manner described above is preferably used as an electrode catalyst layer of a solid polymer fuel cell. In particular, the electrode catalyst layer is preferably used as an anode catalyst layer due to the high tolerance of the support in a hydrogen atmosphere. The anode preferably includes the electrode catalyst layer and a gas diffusion layer. The gas diffusion layer functions as a supporting current collector that has a current collecting function and furthermore functions to sufficiently supply a gas to the electrode catalyst layer. As the gas diffusion layer, a porous material such as carbon paper or carbon cloth can be used, for example. A specific example is a carbon cloth obtained by weaving a thread made of a carbon fiber with its surface coated with polytetrafluoroethylene and a carbon fiber without the coating at a predetermined ratio.

Examples of the solid electrolyte membrane include a proton conductive membrane based on a perfluorosulfonic acid polymer, a hydrocarbon polymer compound doped with an inorganic acid such as phosphoric acid, an organic/inorganic hybrid polymer a moiety of which is substituted with a proton conductive functional group, and a proton conductor obtained by impregnating a polymer matrix with a phosphoric acid solution or a sulfuric acid solution.

A separator is placed on each side of a membrane electrode assembly including the electrode catalyst layer, a solid electrolyte membrane, and a gas diffusion layer, to thereby obtain a solid polymer fuel cell. As the separator, it is possible to use, for example, a separator that has a plurality of unidirectionally extending protrusions (ribs) at regular intervals on a side of the separator, the side being to face the gas diffusion layer. A groove having a rectangular cross section is formed between each pair of adjacent protrusions. The grooves serve as flow paths for supplying/discharging a fuel gas and an oxidant gas such as air. The fuel gas and the oxidant gas are supplied from a fuel gas supplying means and an oxidant gas supplying means, respectively. The separators are preferably disposed on the sides of the membrane electrode assembly such that the grooves formed in one separator and those in the other separator intersect each other at the right angle in plan view. The structural element described above is a minimum unit of a fuel cell, and several tens or several hundreds of the structural elements can be arranged in parallel to compose a cell stack as a fuel cell.

EXAMPLES

Hereinafter, the present invention will be described in further detail by way of examples. However, the scope of the present invention is not limited to the examples given below. Unless otherwise stated, the percent sign "%" used herein means "mass %".

Example 1

(1) Step of Producing Support 6.7 g of metallic titanium and 3.7 g of anatase $TiO_2$ were mixed, and the mixture was heated in a vacuum furnace at 900° C. for 10 hours. The absolute pressure in the vacuum furnace was set to 10-1 Pa or less. Through heating described above, a support made of a titanium oxide was obtained. Crystal structure analysis using powder X-ray diffractionetry (XRD) showed that this titanium oxide is represented by the compositional formula $TiO_{0.5}$.

(2) Step of Supporting Catalyst 4.0 g of the support obtained in the step (1) above and 16.0 g of ethanol were mixed to obtain a slurry. The support in the slurry was pulverized for 10 hours using a paint shaker. Then, 300 g of ethanol and 8 mL of an aqueous nitric acid solution of dinitroanmineplatinum (platinum concentration: 15%) were added to the slurry to thereby obtain a mixed solution. The mixed solution was placed in a four-necked flask. The mixed solution contained in the flask was heated in an oil bath for 6 hours such that the temperature of the mixed solution was 75° C. After that, the mixed solution was cooled and then washed with water to remove ethanol and byproducts (salt components). The cake obtained in this manner was vacuum-dried to obtain a dry powder.

(3) Heating Step

The dry powder obtained in the step (2) was heated. Heating was performed in an atmosphere of a mixed gas consisting of 2 vol % of $H_2$ and the remaining amount of Ar. The heating temperature was 600° C., and the heating time was 2 hours. In this way, a catalyst/support composite including platinum supported as a catalyst was obtained. The catalyst/support composite had a particle diameter $D_2$ of 0.12 μm as measured under a scanning electron microscope according to the above-described method. The catalyst/support composite had a particle diameter $D_{50}$ (the 50th percentile of the particle diameter on a volume basis) of 0.21 μm as measured by a laser diffraction/scattering particle size distribution analysis method. The particle diameter $D_{50}$ was measured by the method described hereinabove after the particles of the catalyst/support composite were mixed with ethanol and dispersed therein using a standard ultrasonic bath for 1 minute.

The catalyst/support composite was subjected to X-ray diffractometry, and it was showed that this titanium oxide had a main phase represented by the compositional formula $TiO_{0.5}$ and a sub phase represented by TiO. Furthermore, $TiO_2$ was also observed as a sub phase.

(4) Step of Forming Coating Oxide Using LPD Method $Nb_2O_5$ was dissolved in an ammonium hydrogen fluoride aqueous solution to obtain an aqueous solution with a niobium concentration of 50 mmol/L. 50 mL of this aqueous solution and 100 g of water were added to 5 g of the catalyst/support composite to obtain a slurry. 100 mL of a 0.5 mol/L boric acid aqueous solution was added to this slurry, and the resulting mixture was stirred at 50° C. for 2 hours to thereby produce a niobium oxide on the surface of the catalyst/support composite. Then, the solids of the slurry were separated from the liquid thereof. The solids were washed and dried, and then subjected to heat treatment at 600° C. for 1 hour in an air atmosphere to thereby produce a coating oxide containing niobium on the surface of the catalyst/support composite.

(5) Dispersing Step

The catalyst/support composite obtained in the step (4) and yttrium-stabilized zirconia balls with a diameter of 1 mm (Vickers hardness 12 GPa) were placed in a container, and pure water, ethanol, and 2-propanol as solvents were sequentially added in a mass ratio of 15:50:35. The resulting mixed solution was dispersed by ultrasonication for 3 minutes. The mixed solution was then stirred at 800 rpm for 20 minutes in a planetary ball mill (ARE310 available from Thinky Corporation). Then, 5% Nafion (registered trademark) (274704-100ML available from Sigma-Aldrich) as an ionomer was added to the mixed solution, and the resulting mixed solution was stirred in the same manner as described above using ultrasonication and a planetary ball mill. The ratio of the mass of the ionomer, I, to the mass of the catalyst/support composite, M, (i.e., I/M) was 0.11. In this way, a dispersion liquid was obtained.

(6) Step of Forming Electrode Catalyst Layer

The dispersion liquid obtained in the step (5) was applied to a polytetrafluoroethylene sheet using a bar coater, and the coating film was dried at 60° C. to obtain an electrode catalyst layer. In the electrode catalyst layer, the ratio of the mass of the ionomer, I, to the mass of the catalyst/support composite, M, (i.e., I/M) was as shown in Table 1 below.

Examples 2 to 4

A coating oxide containing niobium was produced on the surface of the catalyst/support composite and an electrode catalyst layer was formed by using the resulting catalyst/support composite, in the same manner as in Example 1, except that the amount of the niobium aqueous solution in the step (4) was changed. Crystal structure analysis carried out on the support using powder X-ray diffractometry (XRD) showed that the titanium oxide has a main phase represented by the compositional formula $TiO_{0.5}$ and a sub phase represented by TiO.

Example 5

A coating oxide containing tantalum was produced on the surface of the catalyst/support composite and an electrode catalyst layer was formed by using the resulting catalyst/support composite in the same manner as in Example 1, except that, in the step (4), $Ta_2O_5$, instead of $Nb_2O_5$, was dissolved in an ammonium hydrogen fluoride aqueous solution to obtain an aqueous solution with a tantalum concentration of 50 mmol/L and that this tantalum solution was used.

Example 6

The step of producing a support, the step of supporting a catalyst, and the heating step were performed in the same manner as in Example 1. Crystal structure analysis carried out on the support using powder X-ray diffractometry (XRD) showed that this titanium oxide had a main phase represented by the compositional formula $TiO_{0.5}$ and a sub phase represented by TiO. The step of forming a coating oxide was performed using the evaporation-to-dryness method. The evaporation-to-dryness method was carried out in the following manner.

A slurry was obtained by adding 60 g of ethanol to 0.5 g of the catalyst/support composite. Then, 0.1 g of a silane coupling agent (KBE-1003 available from Shin-Etsu Chemical Co., Ltd.) was added to the slurry, and the resulting slurry was heated to 150° C. Under this condition, a 10% aqueous hydrochloric acid solution was added to the slurry to initiate the coupling reaction of the silane coupling agent. The amount added was 0.75 mL.

After the coupling reaction was completed, the slurry was continued to be heated at 150° C. to achieve evaporation to dryness. The solids remaining after the evaporation to dryness were subjected to heat treatment at 600° C. for 1 hour in an air atmosphere to thereby produce a coating oxide containing silicon on the surface of the catalyst/support composite. An electrode catalyst layer was formed by using the catalyst/support composite. The dispersing step and the step of forming an electrode catalyst layer were performed in the same manner as in Example 1.

Example 7

A coating oxide containing silicon was produced on the surface of the catalyst/support composite and an electrode catalyst layer was formed by using the resulting catalyst/support composite, in the same manner as in Example 6, except that the amount of the silane coupling agent used was changed.

Example 8

A coating oxide containing niobium was produced on the surface of the catalyst/support composite and an electrode catalyst layer was formed by using the resulting catalyst/support composite, in the same manner as in Example 1, except that a titanium oxide represented by the compositional formula $Ti_4O_7$ was produced by changing the mixing ratio between metallic titanium and anatase $TiO_2$ used in the step (1) and was used as the support. Crystal structure analysis using powder X-ray diffractometry (XRD) showed that this titanium oxide had a main phase represented by the compositional formula $Ti_4O_7$ and a sub phase represented by $Ti_3O_5$. The catalyst/support composite had a particle diameter $D_2$ of 0.16 μm as measured by the method described above. The catalyst/support composite had a particle diameter $D_{50}$ of 0.25 μm.

Example 9

A coating oxide containing zirconium was produced on the surface of the catalyst/support composite, and an electrode catalyst layer was formed by using the resulting catalyst/support composite, in the same manner as in Example 1, except that in the step (4), $ZrO_2$, instead of $Nb_2O_5$, was dissolved in an ammonium hydrogen fluoride aqueous solution to obtain an aqueous solution with a zirconium concentration of 50 mmol/L and that this zirconium solution was used. Crystal structure analysis using powder X-ray diffractometry (XRD) showed that this titanium oxide had a main phase represented by the compositional formula $TiO_{0.5}$ and a sub phase represented by $TiO$.

Examples 10 to 12

A coating oxide containing niobium was produced on the surface of the catalyst/support composite and an electrode catalyst layer was formed by using the resulting catalyst/support composite, in the same manner as in Example 1, except that the amount of the niobium aqueous solution in the step (4) was changed. Crystal structure analysis carried out on the support using powder X-ray diffractometry (XRD) showed that the titanium oxide had a main phase represented by the compositional formula $TiO_{0.5}$ and a sub phase represented by $TiO$.

Example 13

A coating oxide containing niobium was produced on the surface of the catalyst/support composite and an electrode catalyst layer was formed by using the resulting catalyst/support composite, in the same manner as in Example 1, except that an iridium nitrate solution (iridium concentration: 8.7%) was added together with the aqueous nitric acid solution of dinitroanmineplatinum (platinum concentration: 15%) as the metal materials for a catalyst in the step (2). The amount of each aqueous solution added was 6 mL.

Comparative Example 1

A coating oxide containing niobium was produced on the surface of the catalyst/support composite and an electrode catalyst layer was formed by using the resulting catalyst/support composite, in the same manner as in Example 1, except that the stirring time after adding the boric acid aqueous solution in the step (4) was shorter, specifically, 30 minutes, to produce a smaller amount of the coating oxide containing niobium than that in Example 1.

Comparative Example 2

A coating oxide containing niobium was produced on the surface of the catalyst/support composite and an electrode catalyst layer was formed by using the resulting catalyst/support composite, in the same manner as in Example 1, except that the stirring time after adding the boric acid aqueous solution in the step (4) was longer, specifically, 24 hours, to produce a larger amount of the coating oxide containing niobium than that in Example 1.

Comparative Example 3

This comparative example is equivalent to the example in JP 2016-081584A.
(1) Step of Producing Support
This step was performed in the same manner as in Example 1 described hereinabove.
(2) Step of Forming Coating Oxide Using LPD Method
$Nb_2O_5$ was dissolved in an ammonium hydrogen fluoride aqueous solution to obtain an aqueous solution with a niobium concentration of 50 mmol/L. 50 mL of this aqueous solution and 100 g of water were added to 5 g of the support to obtain a slurry. 100 mL of a 0.5 mol/L boric acid aqueous solution was added to this slurry, and the resulting mixture was stirred at 50° C. for 2 hours to thereby produce a niobium oxide on the surface of the support. Then, the solids of the slurry were separated from the liquid thereof. The solids were washed and dried, and then subjected to heat treatment at 600° C. for 1 hour in an air atmosphere to thereby produce a coating oxide containing niobium on the surface of the support.

(3) Step of Supporting Catalyst 4.0 g of the support obtained in the step (2) above and 16.0 g of ethanol were mixed to obtain a slurry. The support in the slurry was pulverized for 10 hours using a paint shaker. Then, 300 g of ethanol and 8 mL of an aqueous nitric acid solution of dinitroanmineplatinum (platinum concentration: 15%) were added to the slurry to thereby obtain a mixed solution. The mixed solution was placed in a four-necked flask. The mixed solution contained in the flask was heated in an oil bath for 6 hours such that the temperature of the mixed solution was 75° C. After that, the mixed solution was cooled and then washed with water to remove ethanol and byproducts (salt components). The cake obtained in this manner was vacuum-dried to obtain a dry powder.

(4) Heating Step

The dry powder obtained in the step (3) was heated. Heating was performed in an atmosphere of a mixed gas consisting of 2 vol % of $H_2$ and the remaining amount of Ar. The heating temperature was 600° C., and the heating time was 2 hours. In this way, a catalyst/support composite including platinum supported as a catalyst was obtained.

The rest of the process was performed in the same manner as in Example 1 to thereby obtain an electrode catalyst layer.

Evaluation 1

The electrode catalyst layers obtained in Examples and Comparative Examples were analyzed by XPS according to the following procedure to obtain the ratios A2/A1 and A2/A3. Furthermore, the particle diameter $D_1$ and the BET specific surface area of the coating oxide were measured according to the above-described method. Table 1 below shows the results.

In Examples 6 and 7 and Comparative Example 3 in Table 1, the coating oxide was in a membrane form, and thus the particle diameter $D_1$ of the coating oxide was not measured.

Procedure of XPS

The surface of the electrode catalyst layer was analyzed using a PHI Quantes available from Ulvac-Phi, Inc. as an XPS analyzer. The conditions for the analysis were as follows.

Excitation X-ray: Monomer Al-Kα ray (1486.7 eV)
Output: 100 W
Acceleration voltage: 100 kV
Diameter of X-ray irradiation: 100 μmφ
Area to be analyzed: 300 μm×600 μm
Pass energy: 26.0 eV
Energy step: 0.1 eV/step Evaluation 2

Solid polymer fuel cells were fabricated by using the electrode catalyst layers obtained in Examples and Comparative Examples, and the cell voltages thereof were measured. The electrode catalyst layers obtained in Examples and Comparative Examples were used as an anode catalyst layer. A cathode catalyst layer was obtained in the following manner. 1.00 g of platinum on carbon black (TEC10E50E) available from Tanaka Kikinzoku Kogyo and yttrium-stabilized zirconia balls with a diameter of 10 mm were placed in a container, and then pure water, ethanol, and 2-propanol were sequentially added thereto in a mass ratio of 45:35:20 (10.2 g as a mixed solution). The resulting mixed solution obtained in the manner described above was dispersed by ultrasonication for 3 minutes. Next, the mixed solution was stirred at 800 rpm for 20 minutes in a planetary ball mill (ARE310 available from Thinky Corporation). Then, 5% Nafion (registered trademark) (274704-100ML available from Sigma-Aldrich) as an ionomer was added to the mixed solution, and the resulting mixed solution was stirred in the same manner as described above using ultrasonication and a planetary ball mill. The amount of Nafion added was such that the mass ratio "Nafion"/"the platinum on carbon black" was 70.0. The dispersion liquid thus obtained was applied to a polytetrafluoroethylene sheet using a bar coater, and the coating film was dried at 60° C.

The anode catalyst layer and the cathode catalyst layer formed on the polytetrafluoroethylene sheet were each cut into 54 mm squares, and superposed on each other with a Nafion (registered trademark) electrolyte membrane (NRE-212 available from Du-Pont) interposed therebetween. The resultant was heat-pressed in air at 140° C. and 25 kgf/cm$^2$ for 2 minutes to transfer the catalyst layers. In this way, the cathode and anode catalyst layers were respectively formed on the sides of the solid electrolyte membrane made of Nafion, to thereby obtain a CCM.

The obtained CCM was sandwiched between a pair of gas diffusion layers (model number: 29BC available from SGL Carbon LLC). The CCM was further sandwiched between a pair of carbon plates having gas flow paths as separators, to thereby fabricate a solid polymer fuel cell. The fuel cell thus obtained corresponds to a JARI standard cell.

Hydrogen gas was supplied to the anode side of the solid polymer fuel cell, and oxygen gas was supplied to the cathode side of the solid polymer fuel cell. The flow rates were set such that the hydrogen gas utilization rate and the oxygen utilization rate were 70% and 40%, respectively. The hydrogen gas and the oxygen gas were humidified using an external humidifier and thereafter supplied to the fuel cell. Also, temperature adjustment was performed such that the temperature of the fuel cell was 80° C., and the humidity of the supplied gas was adjusted such that the relative humidity was 100% RH. The relationship between the cell voltage and the current density under these conditions was determined. From the obtained relationship the between the cell voltage and the current density, the values of the cell voltage (V) at 0.1 A/cm$^2$ and 1 A/cm$^2$ were obtained. The results are shown in Table 1 below. The current density of 0.1 A/cm$^2$ is suitable for evaluation of the catalytic activity. The current density of 1 A/cm$^2$ is suitable for evaluation of the cell resistance.

Evaluation 3

On the solid polymer fuel cell fabricated according to the method described in Evaluation 2, the current density retention was determined according to the following procedure. The results are shown in Table 1 below.

(1) First Procedure

Hydrogen gas was supplied to the anode side of the solid polymer fuel cell, and air was supplied to the cathode side of the solid polymer fuel cell. The flow rates were set such that the hydrogen gas utilization rate and the oxygen utilization rate were 70% and 40%, respectively. Each gas was humidified using an external humidifier and thereafter supplied to the fuel cell. Also, temperature adjustment was performed such that the temperature of the fuel cell was 80° C., and the humidity of the supplied gas was adjusted such that the relative humidity was 100% RH. The relationship between the cell voltage and the current density under these conditions was determined, and the value of the current density at 0.6 V, $I_1$, was obtained.

(2) Second Procedure

Next, hydrogen gas was supplied to the anode side of the solid polymer fuel cell, and oxygen was supplied to the cathode side of the solid polymer fuel cell. The flow rates were set such that the hydrogen gas utilization rate and the oxygen utilization rate were 70% and 40%, respectively. Each gas was humidified using an external humidifier and thereafter supplied to the fuel cell. Also, temperature adjustment was performed such that the temperature of the fuel cell was 110° C., and the humidity of the supplied gas was adjusted such that the relative humidity was 53% RH. Under these conditions, the fuel cell was operated for 30 hours at a current density of 0.4 A/cm².

(3) Third Procedure

The value of a current density at 0.6 V, $I_2$, was obtained in the same manner as in the first procedure.

(4) Fourth Procedure $(I_2/I_1) \times 100$ was calculated and the value obtained was used as the current density retention.

Evaluation 4

The fluorine concentration in the effluent on the cathode side was measured on each of the solid polymer fuel cells fabricated by using the electrode catalyst layers obtained in Example 1 and Comparative Example 1.

In this technical field, a method of evaluating fluorine discharge has been established in order to evaluate the degradation of electrolyte membranes and ionomers. Furthermore, General Motors reported at the 235th ECS Meeting that the fluorine concentration in the effluent increases under the operating conditions of fuel cells including a material that contains titanium, and that titanium is detected on the cathode side (electrode including no titanium) when the fluorine concentration increases.

Therefore, the inventors of the present invention believe that there is a correlation between the amount of titanium eluted and the fluorine concentration in the effluent on the cathode side. Accordingly, the inventors also believe that the degree of elution of titanium can be evaluated by measuring the fluorine concentration in the effluent on the cathode side. Therefore, the fluorine concentration in the effluent on the cathode side was measured by the method described below.

The effluent from the cathode side of a fuel cell that had been in operation for a long time (30 hours) was collected, and the fluorine concentration in the effluent was analyzed using an ion chromatography analyzer (IC-2020 available from Tosoh Corporation). The total amount of fluorine discharged during the long-term operation was calculated from the found value of the fluorine concentration and the amount of the effluent collected during the long-term operation. The total amount of fluorine discharged was divided by the electrode area, and the resulting value was used as the amount of fluorine discharged (mg/cm²/30 h).

TABLE 1

| | Catalyst/support composite | | | | | | | | | | Fuel cell | | | |
|---|---|---|---|---|---|---|---|---|---|---|---|---|---|---|
| | | | Support | | Particle diameter of coating oxide, D1 (μm) | D1/D2 (%) | BET specific surface area (m²/g) | Catalyst layer | | | Cell voltage (V) | | Current density retention (%) | F concentration in effluent on cathode side (mg/cm²/30 h) |
| | Coating oxide | Catalytic metal | Main phase | Sub phase | | | | A2/A1 | A2/A3 | I/M | 0.1 A/cm² | 1 A/cm² | | |
| Ex. 1 | Nb | Pt | TiO$_{0.5}$ | TiO | 0.028 | 23 | 17.8 | 0.567 | 0.442 | 0.11 | 0.811 | 0.647 | 100.5 | $1.04 \times 10^{-6}$ |
| Ex. 2 | Nb | Pt | TiO$_{0.5}$ | TiO | 0.020 | 17 | 16.7 | 0.573 | 0.500 | 0.11 | 0.806 | 0.646 | 98.2 | |
| Ex. 3 | Nb | Pt | TiO$_{0.5}$ | TiO | 0.017 | 14 | 16.8 | 0.582 | 0.489 | 0.11 | 0.809 | 0.643 | 96.2 | |
| Ex. 4 | Nb | Pt | TiO$_{0.5}$ | TiO | 0.014 | 12 | 12.9 | 1.420 | 0.914 | 0.11 | 0.817 | 0.650 | 90.2 | |
| Ex. 5 | Ta | Pt | TiO$_{0.5}$ | — | 0.028 | 23 | 24.3 | 0.769 | 0.571 | 0.11 | 0.816 | 0.650 | 99.8 | |
| Ex. 6 | Si | Pt | TiO$_{0.5}$ | TiO | — | — | 11.1 | 0.520 | 0.442 | 0.11 | 0.806 | 0.647 | 100.1 | |
| Ex. 7 | Si | Pt | TiO$_{0.5}$ | TiO | — | — | 16.6 | 0.480 | 0.408 | 0.11 | 0.809 | 0.647 | 103.1 | |
| Ex. 8 | Nb | Pt | Ti$_4$O$_7$ | Ti$_3$O$_5$ | 0.042 | 26 | 13.4 | 0.544 | 0.413 | 0.11 | 0.812 | 0.645 | 96.7 | |
| Ex. 9 | Zr | Pt | TiO$_{0.5}$ | TiO | 0.020 | 23 | 17.8 | 0.364 | 0.314 | 0.11 | 0.806 | 0.642 | 92.6 | |
| Ex. 10 | Nb | Pt | TiO$_{0.5}$ | TiO | 0.025 | 25 | 18.0 | 0.565 | 0.440 | 0.068 | 0.799 | 0.642 | 89.6 | |
| Ex. 11 | Nb | Pt | TiO$_{0.5}$ | TiO | 0.025 | 25 | 18.0 | 0.555 | 0.439 | 0.24 | 0.801 | 0.640 | 88.8 | |
| Ex. 12 | Nb | Pt | TiO$_{0.5}$ | TiO | 0.025 | 25 | 18.0 | 0.540 | 0.420 | 0.11 | 0.811 | 0.644 | 93.4 | |
| Ex. 13 | Nb | Pt, Ir | TiO$_{0.5}$ | — | 0.028 | 23 | 17.8 | 0.552 | 0.364 | 0.11 | 0.813 | 0.654 | 96.7 | |
| Com. Ex. 1 | Nb | Pt | TiO$_{0.5}$ | TiO | 0.049 | 41 | 15.3 | 0.325 | 0.167 | 0.11 | 0.800 | 0.635 | 76.9 | $4.69 \times 10^{-5}$ |
| Com. Ex. 2 | Nb | Pt | TiO$_{0.5}$ | TiO | 0.011 | 9 | 9.53 | 1.770 | 1.150 | 0.11 | 0.810 | 0.617 | 66.8 | |
| Com. Ex. 3 | Nb | Pt | TiO$_{0.5}$ | TiO | — | — | 8.87 | 0.333 | 0.200 | 0.11 | 0.782 | 0.541 | 42.3 | |

It is clearly seen from the results shown in Table 1 that the fuel cells fabricated by using the electrode catalyst layers obtained in Examples have higher cell voltages than the fuel cells of Comparative Examples. Furthermore, it is seen that the fuel cells fabricated by using the electrode catalyst layers obtained in Examples have higher current density retentions than the fuel cells of Comparative Examples. These facts mean that, in each of the electrode catalyst layers obtained in Examples, the catalytic activity is high and a decrease in the catalytic activity is prevented, compared with the electrode catalyst layers obtained in Comparative Examples.

Furthermore, it is clearly seen from the results shown in Table 1 that the fuel cell of Example 1 has a lower fluorine concentration in the effluent on the cathode side than the fuel cell of Comparative Example 1. This fact means that, in the fuel cell of Example 1, elution of titanium is prevented compared with the fuel cell of Comparative Example 1.

INDUSTRIAL APPLICABILITY

As described above in detail, the present invention can prevent, in a fuel cell including a titanium oxide as a catalyst support, elution of titanium during operation of the fuel cell, in particular, elution of titanium from an anode, while maintaining the catalytic activity.

The invention claimed is:

1. An electrode catalyst layer for a fuel cell, comprising a catalyst/support composite comprising a support and a catalyst supported on the support,
   wherein the support contains a titanium oxide,
   a surface of the catalyst/support composite has an oxide of at least one element selected from the group consisting of niobium, tantalum, zirconium, and silicon, and
   a ratio A2/A1 is from 0.35 to 1.70, wherein A1 is an atomic ratio of titanium on a surface of the catalyst layer and A2 is an atomic ratio of a total of niobium, tantalum, zirconium, and silicon on the surface of the catalyst layer, A1 and A2 being measured by X-ray photoelectron spectroscopy.

2. The electrode catalyst layer according to claim 1, wherein the titanium oxide has a composition $TiO_x$ ($0.5 \leq x < 2$).

3. The electrode catalyst layer according to claim 1, wherein the catalyst contains platinum, or an alloy of platinum and one or more of iridium and ruthenium.

4. The electrode catalyst layer according to claim 1, further comprising an ionomer,
   wherein a ratio I/M is from 0.06 to 0.25, wherein I is a mass of the ionomer and M is a mass of the catalyst/support composite.

5. A solid polymer fuel cell comprising the electrode catalyst layer according to claim 1 as an anode catalyst layer.

* * * * *